United States Patent
Nakamura et al.

(10) Patent No.: US 12,432,433 B2
(45) Date of Patent: Sep. 30, 2025

(54) IN-VEHICLE CAMERA

(71) Applicant: PANASONIC INTELLECTUAL PROPERTY MANAGEMENT CO., LTD., Osaka (JP)

(72) Inventors: Ken Nakamura, Kanagawa (JP); Kazuhiro Abe, Tokyo (JP); Masayuki Yoshie, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 133 days.

(21) Appl. No.: 18/528,415

(22) Filed: Dec. 4, 2023

(65) Prior Publication Data
US 2024/0187718 A1    Jun. 6, 2024

(30) Foreign Application Priority Data
Dec. 5, 2022   (JP) .................... 2022-194501

(51) Int. Cl.
*H04N 23/54* (2023.01)
*H04N 23/51* (2023.01)
*H04N 23/55* (2023.01)

(52) U.S. Cl.
CPC ............ *H04N 23/54* (2023.01); *H04N 23/51* (2023.01); *H04N 23/55* (2023.01)

(58) Field of Classification Search
CPC ........ H04N 23/54; H04N 23/51; H04N 23/55
USPC ........................................... 348/148
See application file for complete search history.

(56) References Cited

U.S. PATENT DOCUMENTS

| | | | | |
|---|---|---|---|---|
| 6,292,629 | B1* | 9/2001 | Sensui | G03B 17/20 396/296 |
| 2007/0278406 | A1* | 12/2007 | Haug | G01S 7/4813 359/885 |
| 2008/0100910 | A1* | 5/2008 | Kim | G02B 5/282 359/356 |
| 2009/0256229 | A1 | 10/2009 | Ishikawa et al. | |
| 2011/0096163 | A1* | 4/2011 | Chen | G08B 13/19626 348/143 |
| 2017/0064175 | A1* | 3/2017 | Furutake | G02B 3/02 |
| 2020/0399467 | A1* | 12/2020 | Kang | G02B 7/021 |
| 2021/0199953 | A1* | 7/2021 | Hong | G02B 7/026 |
| 2021/0373428 | A1* | 12/2021 | Horibe | G03B 30/00 |

(Continued)

FOREIGN PATENT DOCUMENTS

WO   2007058073 A1   5/2007
WO   2018061564 A1   4/2018

*Primary Examiner* — Matthew David Kim
(74) *Attorney, Agent, or Firm* — Seed Intellectual Property Law Group LLP

(57) ABSTRACT

An in-vehicle camera includes a lens barrel including at least one lens and being tubular, an imaging element disposed on the circuit board and on an optical axis of the at least one lens, a ring member made of a first resin having a first light transmittance, and disposed to protrude in a direction away from the optical axis over an entire periphery of the lens barrel, and a housing portion a part of which has a tubular shape, and one end surface of the tubular shape is made of a second resin having a second light transmittance smaller than the first light transmittance. The in-vehicle camera further includes a third resin disposed on an inner side of the tubular shape between the ring member and the imaging element in a direction of the optical axis, and having a third light transmittance smaller than the first light transmittance.

15 Claims, 5 Drawing Sheets

(56) References Cited

U.S. PATENT DOCUMENTS

| | | | | |
|---|---|---|---|---|
| 2022/0003901 A1* | 1/2022 | Tanaka | ................... | B32B 7/023 |
| 2022/0137391 A1* | 5/2022 | Jia | ........................... | G02B 3/14 |
| | | | | 359/315 |
| 2022/0388458 A1* | 12/2022 | Wang | ................ | H01R 13/6593 |
| 2023/0164251 A1* | 5/2023 | Jung | ..................... | G03B 11/00 |
| | | | | 455/556.1 |
| 2023/0226987 A1* | 7/2023 | He | ......................... | C03C 17/36 |
| | | | | 428/38 |

\* cited by examiner

IN-VEHICLE CAMERA

CROSS-REFERENCE TO RELATED APPLICATIONS

This application is based on and claims priority under 35 USC 119 from Japanese Patent Application No. 2022-194501 filed on Dec. 5, 2022, the entire content of which is incorporated herein by reference.

TECHNICAL FIELD

The present disclosure relates to an in-vehicle camera.

BACKGROUND ART

In recent years, in response to demands for improvement in safety of a vehicle, introduction of an automated driving function, and the like, development of an in-vehicle camera that is mounted in a vehicle and images the inside and outside of the vehicle has become active (for example, see WO2007/058073 and WO2018/061564).

A level of demands related to the safety, the automated driving function, and the like, which are required for a vehicle, continues to increase, and further improvement in performance and the like are also required for the in-vehicle camera.

The present disclosure relates to a technique for providing a new in-vehicle camera.

SUMMARY OF INVENTION

The present disclosure provides an in-vehicle camera including a lens barrel including at least one lens and being tubular, a circuit board having a first surface and a second surface opposite to the first surface, an imaging element disposed on the first surface of the circuit board and on an optical axis of the at least one lens, a ring member made of a first resin having a first light transmittance with respect to a predetermined wavelength, disposed to protrude in a direction away from the optical axis over an entire periphery of the lens barrel, and having a first surface and a second surface opposite to the first surface, and a housing portion accommodating at least the circuit board, in which at least a part of the housing portion having a tubular shape, and at least one end surface of the tubular shape is made of a second resin having a second light transmittance smaller than the first light transmittance with respect to the predetermined wavelength. The one end surface of the tubular shape of the housing portion is fixed with the second surface of the ring member. The in-vehicle camera further includes a third resin disposed on an inner side of the tubular shape of the housing portion over an entire periphery around the optical axis and between the second surface of the ring member and the imaging element in a direction of the optical axis, and having a third light transmittance smaller than the first light transmittance with respect to the predetermined wavelength.

According to the present disclosure, in the in-vehicle camera, since light coming from the outside is prevented from passing through the ring member and entering the inside of the housing portion, an adverse influence on the imaging of the imaging element can be prevented.

DESCRIPTION OF EMBODIMENTS

Hereinafter, embodiments that specifically disclose an in-vehicle camera according to the present disclosure will be described in detail with reference to the drawings as appropriate. However, unnecessarily detailed description may be omitted. For example, a detailed description of well-known matters and a redundant description of substantially the same configuration may be omitted. This is to avoid unnecessary redundancy of the following description and to facilitate understanding of those skilled in the art. It should be noted that the accompanying drawings and the following description are provided for those skilled in the art to fully understand the present disclosure, and are not intended to limit the subject matter described in the claims.

Figure 1A:
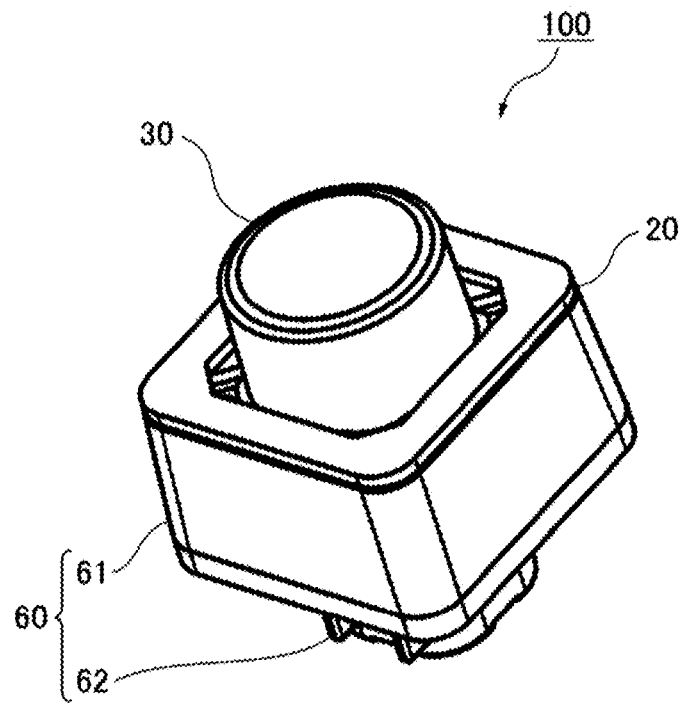
FIG. 1A is a top perspective view of an in-vehicle camera according to an embodiment.
Figure 1B:
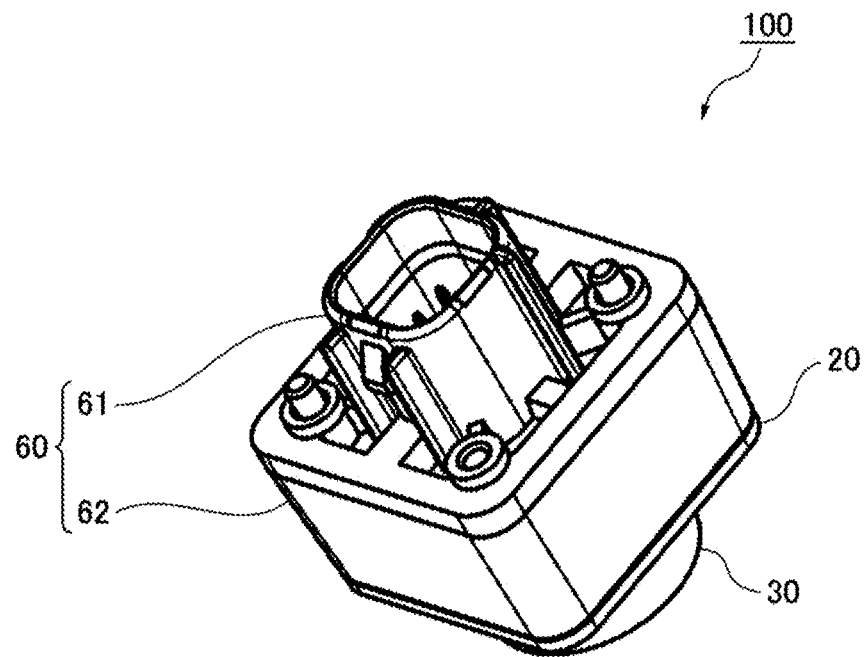
FIG. 1B is a bottom perspective view of the in-vehicle camera according to the embodiment.
Figure 2:
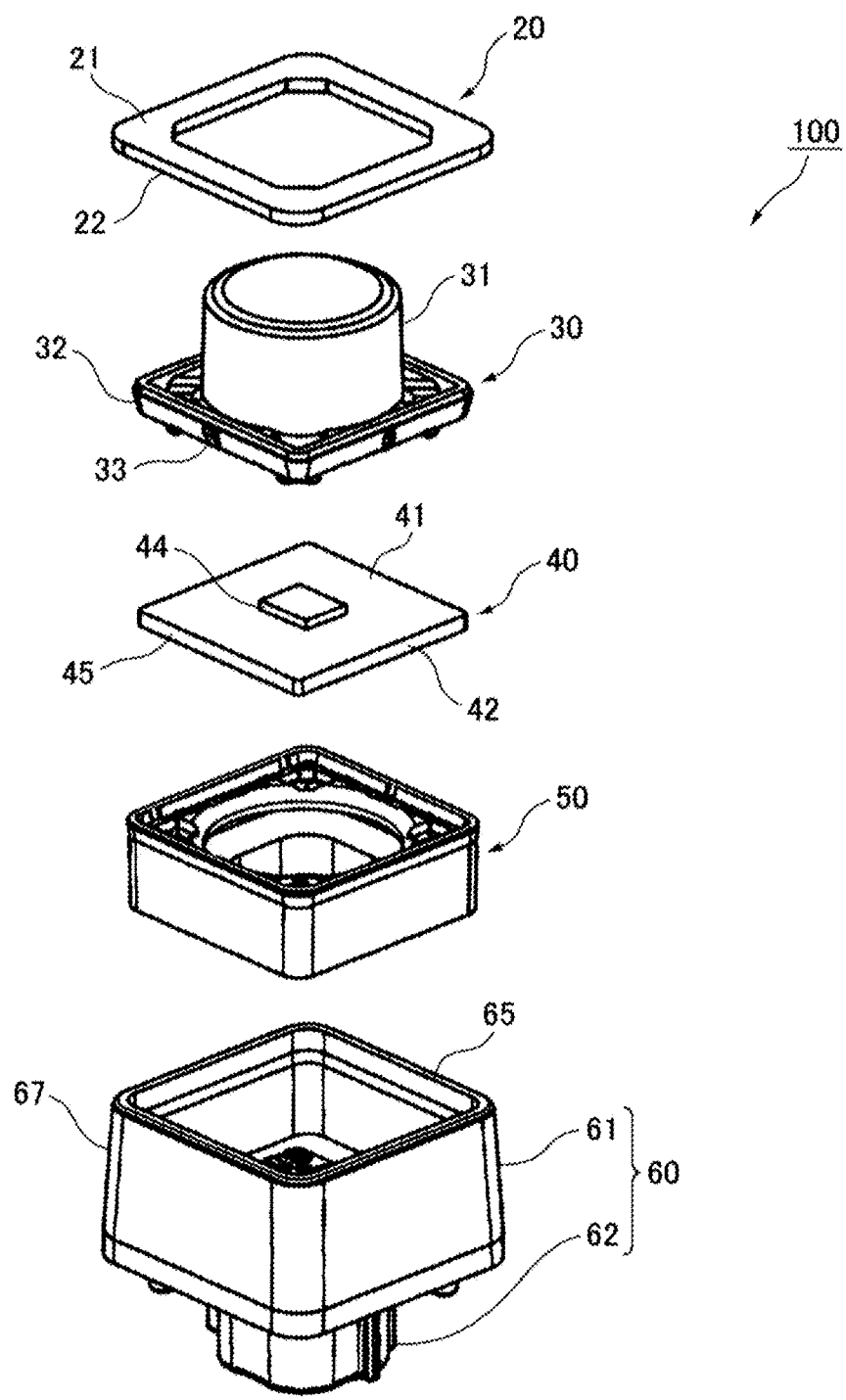
FIG. 2 is an exploded perspective view of the in-vehicle camera according to the embodiment.
Figure 3:
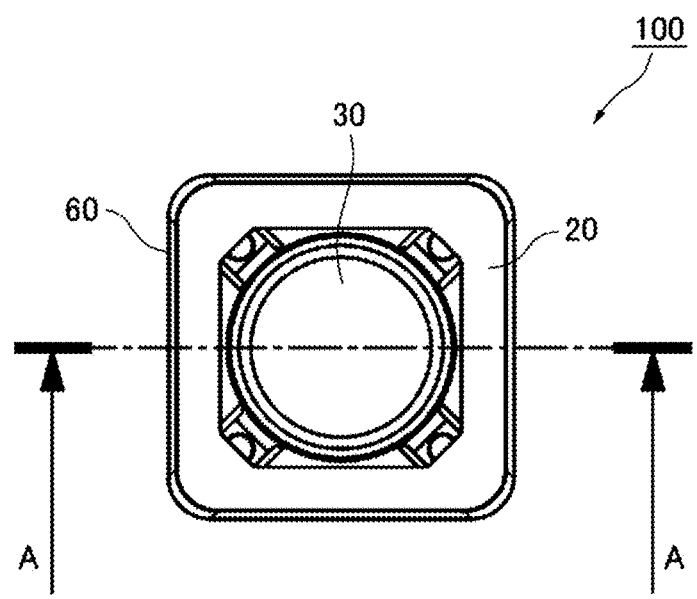
FIG. 3 is a top view of the in-vehicle camera according to the embodiment.

FIG. 1A is a top perspective view of an in-vehicle camera 100 according to an embodiment. FIG. 1B is a bottom perspective view of the in-vehicle camera 100 according to the embodiment. FIG. 2 is an exploded perspective view of the in-vehicle camera 100 according to the embodiment. FIG. 3 is a top view of the in-vehicle camera 100 according to the embodiment.

The in-vehicle camera 100 is an imaging device that is installed at front and rear ends, left and right side surfaces, and the like of a vehicle body of a vehicle, and images the inside and outside of the vehicle body of the vehicle. In recent years, development of the in-vehicle camera 100 has become active in response to demands for improvement in safety of the vehicle, introduction of an automated driving function, and the like.

The in-vehicle camera 100 of the present embodiment includes a lens barrel 30, a circuit board 40 (see FIG. 2), a ring member 20, a third resin 50 (see FIG. 2), and a housing portion 60.

A main body 31, which is a part of the lens barrel 30, has a tubular or cylindrical shape, and at least one lens (not shown) is provided inside the main body 31. When a plurality of lenses are provided in the lens barrel 30, the lenses are arranged such that optical axes thereof (a vertical direction in FIG. 2) coincide with one another, and constitute a lens group used to image the inside and outside of the vehicle body of the vehicle.

The lens barrel 30 has a flange portion 32 (see FIG. 2) projecting outward from an outer circumferential surface of the main body 31. The flange portion 32 is located in the vicinity of an opening of an internal space of the housing portion 60 to be described later, and protrudes toward an inner peripheral surface of a housing side wall 67 (see FIG. 2) of housing portion 60. At least a part of the flange portion 32 is bonded to the housing portion 60 via the ring member 20.

The lens barrel 30 is made of, for example, a polyamide resin, an olefin resin, a vinyl resin, a styrene resin, an acrylic resin, a polyester-based resin, a polycarbonate-based resin, a polyarylate-based resin, a polysulfone-based resin, a polyphenylene oxide-based resin, a polyether sulfone-based resin, or a polyetherimide-based resin. One type of resin or a plurality of types of resins may be used. The main resin may contain an absorbent that absorbs laser light, a coloring material, or both.

Further, the lens barrel 30 has a positioning rib 33 that rises in a direction perpendicular to an optical axis of the lens barrel 30 (in other words, in a planar direction) in order to position the lens barrel 30 with respect to the housing portion 60.

The circuit board 40 is disposed in the internal space of the housing portion 60, has a first surface 41 facing the lens barrel 30, a second surface 42 located on an opposite side of the first surface 41, and an end surface 45 connecting the first surface 41 and the second surface 42. The circuit board 40 includes an imaging element 44 that is disposed on the first surface 41 and on the optical axis of the lens barrel 30, and images light that passes through the lens barrel 30. The imaging element 44 has sensitivity to light in a wavelength region of, for example, 350 nm to 1200 nm.

The ring member 20 is formed of a rectangular annular flat plate in plan view, and is fixed to the lens barrel 30 and the housing portion 60. An inner peripheral surface of the ring member 20 faces the outer circumferential surface of the main body 31 of the lens barrel 30. An inner diameter of the ring member 20 has a length into which the main body 31 can be inserted.

The ring member 20 is disposed to protrude in a direction away from the optical axis of the lens of the lens barrel 30 over the entire periphery of the lens barrel 30 (the entire periphery around the optical axis of the lens). The ring member 20 has a first surface 21 facing the outside of the in-vehicle camera 100, and a second surface 22 opposite to the first surface 21 and facing a housing portion 60 side.

The ring member 20 is made of a first resin having a first light transmittance. For example, the first resin includes a polyester resin, a polyolefin resin, a polyamide resin, a vinyl chloride resin, and a fluorine resin. As the polyester resin, polybutylene terephthalate (PBT), polyethylene terephthalate (PET), or the like can be used. As the polyolefin resin, polyethylene and polypropylene can be used. One type of first resin or a plurality of types of first resins may be used. In addition, in a case of using laser welding to be described later, a coloring material, a filler, or both may be contained in the main light transmitting resin as long as a transmission performance of a certain level or more can be realized.

The first light transmittance of the first resin is, for example, 20% or more with respect to light in a wavelength region of 800 nm to 1200 nm which is a wavelength of laser light used for laser welding. The first light transmittance of the first resin is, for example, 0% or more and 5% or less with respect to light of 350 nm to 800 nm which is a wavelength region of visible light.

The ring member 20 has a flat rectangular annular shape in the present embodiment, but is not limited thereto, and a welded portion may have a flat plate shape. Accordingly, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The housing portion 60 is a member which has an internal space and at least a part of which has a tubular or cylindrical shape, and the housing portion 60 includes a large-diameter tubular portion 61 and a small-diameter tubular portion 62. The large-diameter tubular portion 61 has a larger cross-sectional area than the small-diameter tubular portion 62, and has a rectangular cross section. The large-diameter tubular portion 61 accommodates at least the circuit board 40. The small-diameter tubular portion 62 mainly accommodates a connector (not shown) that secures electrical connection with the outside of the in-vehicle camera 100. The large-diameter tubular portion 61 and the small-diameter tubular portion 62 can be integrally formed, but the large-diameter tubular portion 61 and the small-diameter tubular portion 62 prepared in advance may be bonded by a method such as welding or screwing. In the present embodiment, the housing portion 60 has a rectangular tubular shape, but is not limited thereto, and may have a polygonal tubular shape other than the rectangular tubular shape, a circular or elliptical tubular shape, or another tubular shape.

The housing portion 60 is made of a second resin having a second light transmittance smaller than the first light transmittance of the first resin constituting the ring member 20. In particular, in the present embodiment, one end surface 65 of the large-diameter tubular portion 61 on a side where the ring member 20 and the lens barrel 30 are located defines a shape of the housing portion 60, and at least the one end surface 65 is made of the second resin. Most of the housing portion 60 may be made of metal, and only the one end surface 65 may be made of resin. The one end surface 65 is fixed to the second surface 22 of the ring member 20 (see FIG. 5).

As the second resin, for example, a polyamide resin, an olefin resin, a vinyl resin, a styrene resin, an acrylic resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of resin or a plurality of types of resins may be used. In a case of using laser welding, the main light absorbing resin may contain an absorbent for absorbing laser light, a coloring material, or both.

The second light transmittance of the second resin is, for example, 0% or more and 5% or less with respect to light in a wavelength region of 350 nm to 1200 nm.

Figure 4:
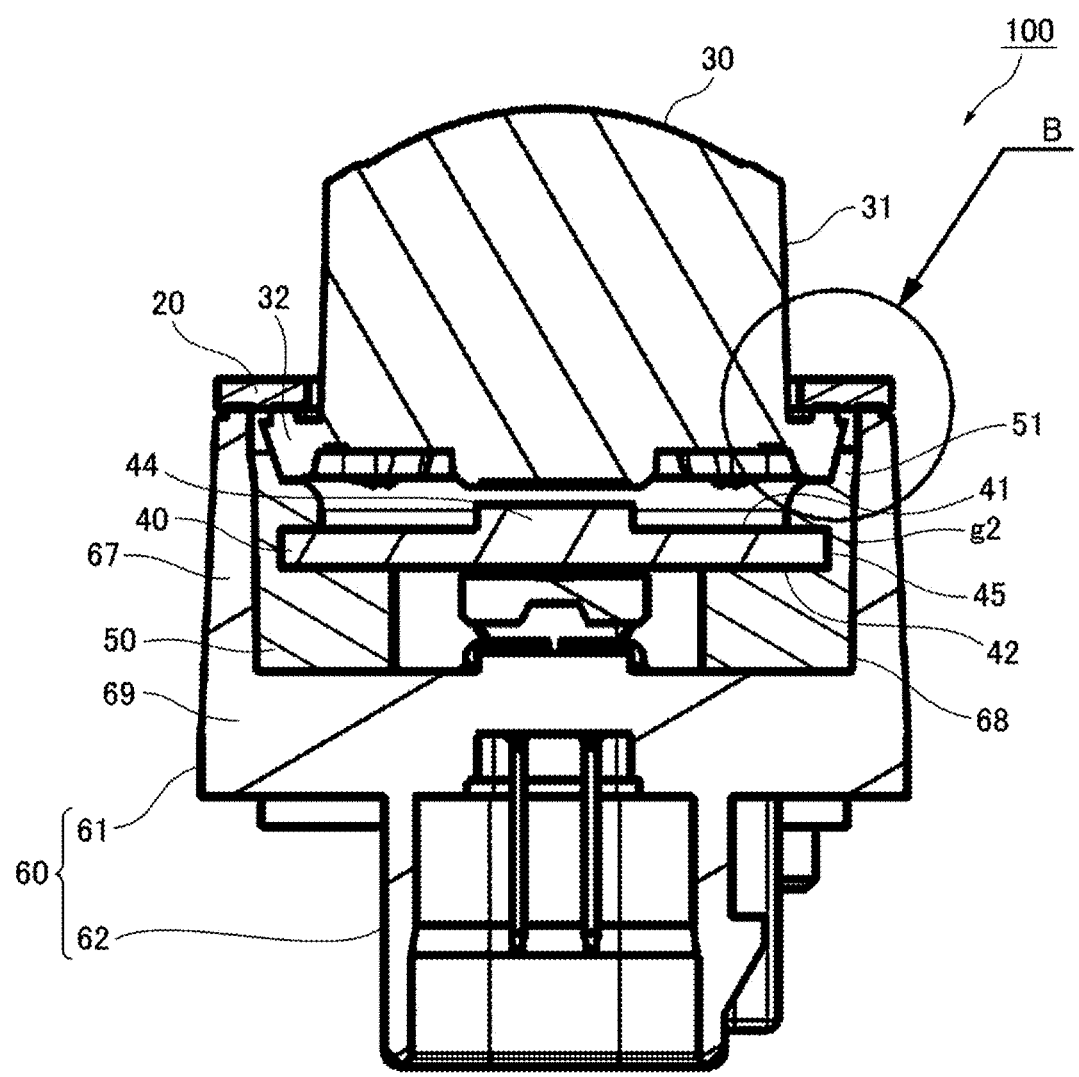
FIG. 4 is a cross-sectional view taken along a line A-A of FIG. 3.
Figure 5:
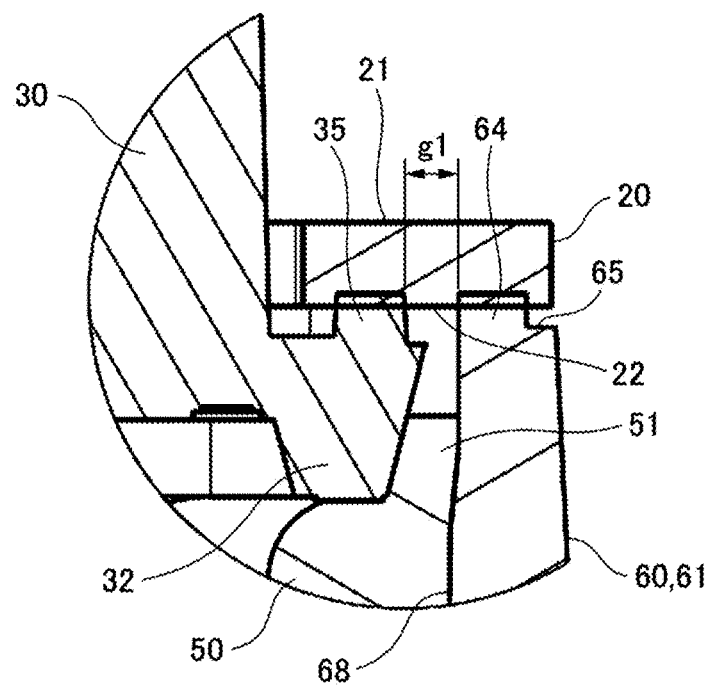
FIG. 5 is an enlarged view of a portion B in FIG. 4.

FIG. 4 is a cross-sectional view taken along a line A-A of FIG. 3. FIG. 5 is an enlarged view of a portion B in FIG. 4. As shown in the figures, the third resin 50 is disposed on an inner side of the tubular shape of the housing portion 60 over the entire periphery around the optical axis of the lens. At least a part of the third resin 50 is disposed between the second surface 22 of the ring member 20 and the imaging element 44 in a direction of the optical axis of the lens.

The third resin 50 has a third light transmittance smaller than the first light transmittance of the first resin constituting the ring member 20. The third light transmittance of the third resin may be, for example, 0% or more and 5% or less with respect to light in a wavelength region of 350 nm to 1200 nm. In particular, the third light transmittance of the third resin is, for example, 0% or more and 5% or less with respect to light of 800 nm to 1200 nm which is the wavelength region of the laser light transmitted by the first resin.

The third resin 50 may be disposed by potting or may be implemented by a component formed in advance by injection molding or the like. In the present embodiment, the third resin 50 is molded into a box-shaped member so as to be accommodated inside the tubular shape of the housing portion 60.

In the present embodiment, the third resin 50 has a shape that is not in contact with the imaging element 44 on the circuit board 40. With such a shape, it is possible to prevent the third resin 50 from blocking light that passes through the lens from reaching the imaging element 44, and an adverse influence on the imaging element 44 can be prevented. The adverse influence on the imaging element 44 corresponds to, for example, that near red light in a wavelength region of 800 nm to 1200 nm acts on the imaging element and the image quality of the image output from the imaging element deteriorates.

The ring member 20 will be described again. As described above, the ring member 20 is fixed to the lens barrel 30 and the housing portion 60. The fixation can be realized by, for example, laser welding. Specifically, in the present embodiment, the one end surface 65 of the tubular shape of the housing portion 60 and the second surface 22 of the ring member 20 are fixed to each other by laser welding using a laser beam transmitted from the first surface 21 to the second surface 22 of the ring member 20. By fixing using laser welding, the ring member 20 and the housing portion 60 can be easily and reliably fixed.

As shown in FIG. 5, in the present embodiment, the flange portion 32 which is a lower end portion of the lens barrel 30 is disposed at an upper opening portion of the housing portion 60, and a part of the flange portion 32 is welded to the second surface 22 which is a lower surface of the ring member 20. Further, the one end surface 65 of the housing portion 60 is also welded to the second surface 22 of the ring member 20, and as a result, the housing portion 60 and the lens barrel 30 are integrally assembled via the ring member 20. The lens barrel 30 is disposed such that the entire lens barrel 30 exists on the inner side of the housing portion 60 in an orthogonal direction orthogonal to the optical axis.

In a general laser welding method, when a laser is emitted to a light transmitting resin in a state where a pressure is applied to the resin, the laser is transmitted without being absorbed by the light transmitting resin and is absorbed by a surface of a light absorbing resin. Energy of the absorbed laser is converted into heat, and the surface of the light absorbing resin is heated. Further, a surface of the light transmitting resin in contact with the surface of the light absorbing resin is also heated due to heat conduction. Thus, the resin is melted at an interface between the light absorbing resin and the light transmitting resin. When the laser emission is stopped, the molten resin is solidified and both resins are welded.

In the present embodiment, first, a laser is emitted in a state where the ring member 20 is pressed against the flange portion 32 of the lens barrel 30, and the second surface 22 of the ring member 20 and the flange portion 32 are welded. Thereafter, the laser is emitted in a state where the ring member 20 is pressed against the one end surface 65 of the housing portion 60, and the second surface 22 of the ring member 20 and the one end surface 65 are welded. The welded ring member 20 may also be referred to as a welding ring. A wavelength of the laser light used for laser welding is set, for example, in a range of 970 nm to 1070 nm.

Since the molding accuracy of a member (the molding accuracy of the resin material) has a limit, it is difficult to mold the welding ring (the ring member 20), the surface of the flange portion 32, the one end surface 65 of the housing portion 60, and the like into a perfect plane, and at least one of the surfaces inevitably has a certain amount of undulations and irregularities. Therefore, it is not easy to appropriately achieve laser welding between flat surfaces.

Therefore, in the present embodiment, a first welding rib 35 in contact with the welding ring (ring member 20) is formed on the flange portion 32 in advance, and a second welding rib 64 in contact with the welding ring (ring member 20) is formed on the one end surface 65 of the housing portion 60 in advance. At the time of laser welding, by melting the first welding rib 35 and the second welding rib 64 by a predetermined melting amount (for example, about 0.1 mm to 0.2 mm), appropriate welding can be achieved while eliminating the influence of the undulations, irregularities, and the like.

It is desirable to fix (including laser welding) the one end surface 65 of the housing portion 60 to the ring member 20 over the entire periphery of the tubular shape of the housing portion 60. Accordingly, the ring member 20 and the housing portion 60 can be firmly fixed to each other.

The lens barrel 30 and the ring member 20 may be a single member formed integrally in advance before being attached to the housing portion 60. By using such a member, a process of fixing the lens barrel 30 and the ring member 20 can be omitted, and therefore the assembly process of the in-vehicle camera 100 can be simplified.

Further, the lens barrel 30 and the ring member 20 may be a single member that is bonded in advance before being attached to the housing portion 60. The bonding may be implemented by the laser welding described above. By using such a member, a process of fixing the lens barrel 30 and the ring member 20 can be omitted, and therefore the assembly process of the in-vehicle camera 100 can be simplified.

The lens barrel 30 and the housing portion 60 are bonded to each other via the welding ring (ring member 20), but it is difficult to completely eliminate a gap formed between the lens barrel 30 and the housing portion 60 due to the molding accuracy of the members. If there is such a gap, light coming from the outside may pass through the gap instead of passing through the lens barrel 30 and may enter the internal space of the housing portion 60.

For example, as shown in FIG. 5, a gap g1 may be formed between an inner surface 68 of the housing portion 60 and the flange portion 32 of the lens barrel 30. Although the ring member 20 covers the gap g1, the first resin constituting the ring member 20 has a relatively high first light transmittance assuming welding by laser light. As a result, there is a possibility that the light from the outside that does not pass through the lens barrel 30 easily passes through the ring member 20 and the gap g1, and enters the internal space of the housing portion 60. When such light reaches the imaging element 44, the imaging may be adversely influenced.

In order to cope with the above-described concern, in the present embodiment, the third resin 50 having the third light transmittance smaller than the first light transmittance of the first resin constituting the ring member 20 is disposed inside the housing portion 60. The third resin 50 is disposed on the inner side of the tubular shape of the housing portion 60 over the entire periphery around the optical axis of the lens.

Further, at least a part of the third resin 50 is disposed between the second surface 22 of the ring member 20 and the imaging element 44 in the direction of the optical axis of the lens. For example, a protruding portion 51 which is a part of the third resin 50 protrudes from one end surface of the third resin 50 toward the second surface 22 of the ring member 20, and at least the protruding portion 51 is disposed between the second surface 22 of the ring member 20 and the imaging element 44.

In such a configuration, since the third resin 50 having a relatively small light transmittance prevents the light coming from the outside from entering the inside of the housing portion 60 through the ring member 20 and the gap g1, the adverse influence on the imaging of the imaging element 44 can be prevented. In particular, since the third resin 50 prevents transmission of light coming from the outside and having a wavelength of 800 nm to 1200 nm which is a wavelength region of the laser light transmitted through the ring member 20, the adverse influence on the imaging of the imaging element 44 can be prevented.

Further, in the present embodiment, the flange portion 32 which is a part of the lens barrel 30 protrudes to the inner side of the housing portion 60 with the ring member 20 as a reference. Further, at least a part of the third resin 50, that is, the protruding portion 51 is disposed between the flange portion 32 of the lens barrel 30 and the inner surface 68 of tubular shape of the housing portion 60. According to such a configuration, light from the outside can be more reliably prevented from passing through the ring member 20 and entering the inside of the housing portion 60.

The gap g1 is described as an example of a gap through which light passes, but a gap may also be formed at another location by the configurations of the housing portion 60 and the lens barrel 30. Even if a gap is formed at another position, the third resin 50 is disposed according to the position and shape of the gap, thereby preventing light from entering.

Next, another function of the third resin 50 will be described. Electronic components such as the circuit board 40 are disposed in the internal space of the housing portion 60. When these electronic components are driven, heat is generated in the narrow internal space, which may cause failure in the in-vehicle camera 100.

In relation to this problem, attention is paid to the third resin 50. As shown in FIG. 4, the third resin 50 occupies a large volume ratio in the internal space of the housing portion 60. Therefore, it is conceivable to easily avoid the failure by making the third resin 50 function as a heat dissipating material for dissipating the heat generated in the internal space of the housing portion 60 to the outside.

From such a viewpoint, it is desirable that the third resin 50 is made of a material containing silicone mixed with at least a thermally conductive substance. The silicone mixed with the thermally conductive substance has a heat dissipation function, and can efficiently dissipate heat inside the housing portion 60. The thermally conductive substance is a substance having higher thermal conductivity than silicone, and is an inorganic material such as aluminum oxide.

From the viewpoint of efficient heat dissipation, as shown in FIG. 4, it is desirable that the third resin 50 has the following shape.

A part of the third resin 50 is in contact with the first surface 41 of the circuit board 40. Thus, the heat of the circuit board 40 can be efficiently dissipated.

Further, a part of the third resin 50 is also in contact with the inner surface 68 of the tubular shape of the housing portion 60. Thus, the heat inside the housing portion 60 can be efficiently dissipated.

A part of the third resin 50 is also disposed in a gap g2 formed between the end surface 45 of the circuit board 40 and the inner surface 68 of the tubular shape of the housing portion 60. Thus, the heat of the circuit board 40 can be efficiently dissipated.

A part of the third resin 50 is also in contact with the second surface 42 of the circuit board 40. Thus, the heat of the circuit board 40 can be efficiently dissipated.

The housing portion 60 includes a bottom surface portion 69, that closes the tubular shape, on a side opposite to the one end surface 65 of the tubular shape. The bottom surface portion 69 is formed at an end portion of the large-diameter tubular portion 61. Thus, the housing portion 60 can accommodate various components. Further, a part of the third resin 50 is also in contact with the inner surface 68 of the bottom surface portion 69. Thus, the heat inside the housing portion 60 can be efficiently dissipated.

As described above, at least the following technical ideas are described in the present disclosure. In addition, although the parenthesis shows the components corresponding to the above-described embodiment, the present disclosure is not limited thereto.

(1) An in-vehicle camera including:
  a lens barrel (lens barrel 30) including at least one lens and being cylindrical;
  a circuit board (circuit board 40) having a first surface (first surface 41) and a second surface (second surface 42) opposite to the first surface;
  an imaging element (imaging element 44) disposed on the first surface of the circuit board and on an optical axis of the at least one lens;
  a ring member (ring member 20) made of a first resin having a first light transmittance with respect to a predetermined wavelength, disposed to protrude in a direction away from the optical axis over an entire periphery of the lens barrel, and having a first surface and a second surface opposite to the first surface; and
  a housing portion (housing portion 60) at least a part of which has a tubular shape, in which at least one end surface (one end surface 65) of the tubular shape is made of a second resin having a second light transmittance smaller than the first light transmittance with respect to the predetermined wavelength and which accommodates at least the circuit board, wherein
  the one end surface of the tubular shape of the housing portion is fixed with the second surface of the ring member, and
  the in-vehicle camera further includes a third resin (third resin 50) disposed on an inner side of the tubular shape of the housing portion over an entire periphery around the optical axis and between the second surface of the ring member and the imaging element in a direction of the optical axis, and having a third light transmittance smaller than the first light transmittance with respect to the predetermined wavelength.

Therefore, in the in-vehicle camera, since light coming from the outside is prevented from passing through the ring member and entering the inside of the housing portion, an adverse influence on the imaging of the imaging element can be prevented.

(2) The in-vehicle camera described in (1), in which
  the third resin is not in contact with the imaging element on the circuit board.

Therefore, in the in-vehicle camera, the third resin can prevent the adverse influence on the imaging element.

(3) The in-vehicle camera described in (1), in which
  the one end surface of the tubular shape of the housing portion is fixed with the ring member over the entire periphery of the tubular shape.

Therefore, in the in-vehicle camera, the ring member and the housing portion can be firmly fixed to each other.

(4) The in-vehicle camera described in (1), in which
  the one end surface of the tubular shape of the housing portion and the second surface of the ring member are fixed by laser welding using a laser beam transmitted from the first surface to the second surface of the ring member.

Therefore, in the in-vehicle camera, the ring member and the housing portion can be easily and reliably fixed.

(5) The in-vehicle camera described in (1), in which
  the lens barrel and the ring member are integrally formed.

Therefore, in the in-vehicle camera, the assembly process can be simplified.

(6) The in-vehicle camera described in (1), in which the lens barrel and the ring member are bonded to each other.

Therefore, in the in-vehicle camera, the assembly process can be simplified.

(7) The in-vehicle camera described in (1), in which the third resin contains at least silicone.

Therefore, in the in-vehicle camera, the heat inside the housing portion can be efficiently dissipated.

(8) The in-vehicle camera described in (1), in which
a part of the lens barrel protrudes to an inner side of the housing portion with the ring member as a reference, and
at least a part of the third resin is disposed between the part of the lens barrel and an inner surface (inner surface 68) of the tubular shape of the housing portion.

Therefore, in the in-vehicle camera, light from the outside can be more reliably prevented from passing through the ring member and entering the inside of the housing portion.

(9) The in-vehicle camera described in (1), in which
a part of the third resin is in contact with the first surface of the circuit board.

Therefore, in the in-vehicle camera, heat of the circuit board can be efficiently dissipated.

(10) The in-vehicle camera described in (9), in which
a part of the third resin is in contact with an inner surface of the tubular shape of the housing portion.

Therefore, in the in-vehicle camera, the heat inside the housing portion can be efficiently dissipated.

(11) The in-vehicle camera described in (10), in which
the circuit board has an end surface (end surface 45) connecting the first surface of the circuit board and the second surface of the circuit board, and
a part of the third resin is disposed between the end surface of the circuit board and the inner surface of the tubular shape of the housing portion.

Therefore, in the in-vehicle camera, heat of the circuit board can be efficiently dissipated.

(12) The in-vehicle camera described in (11), in which
a part of the third resin is in contact with the second surface of the circuit board.

Therefore, in the in-vehicle camera, heat of the circuit board can be efficiently dissipated.

(13) The in-vehicle camera described in (1), in which
the housing portion includes a bottom surface portion, that closes the tubular shape, on a side opposite to the one end surface of the tubular shape.

Therefore, in the in-vehicle camera, the housing portion can accommodate various components.

(14) The in-vehicle camera described in (13), in which
a part of the third resin is in contact with an inner surface of the bottom surface portion (bottom surface portion 69) of the housing portion.

Therefore, in the in-vehicle camera, the heat inside the housing portion can be efficiently dissipated.

Although the embodiment has been described above with reference to the accompanying drawings, the present disclosure is not limited to such an example. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the embodiments described above may be combined freely in a range without deviating from the spirit of the disclosure.

INDUSTRIAL APPLICABILITY

The present disclosure is useful as an in-vehicle camera in which light coming from outside is prevented from passing through the ring member and entering the inside of the housing portion, and an adverse influence on imaging of the imaging element is prevented.

What is claimed is:

1. An in-vehicle camera comprising:
a lens barrel including at least one lens and being tubular;
a circuit board having a first surface and a second surface opposite to the first surface;
an imaging element disposed on the first surface of the circuit board and on an optical axis of the at least one lens;
a ring member made of a first resin having a first light transmittance with respect to a predetermined wavelength, disposed to protrude in a direction away from the optical axis over an entire periphery of the lens barrel, and having a first surface and a second surface opposite to the first surface; and
a housing portion accommodating at least the circuit board, in which at least a part of the housing portion having a tubular shape, and at least one end surface of the tubular shape is made of a second resin having a second light transmittance smaller than the first light transmittance with respect to the predetermined wavelength, wherein
the one end surface of the tubular shape of the housing portion is fixed with the second surface of the ring member, and
the in-vehicle camera further comprises a third resin disposed on an inner side of the tubular shape of the housing portion over an entire periphery around the optical axis and between the second surface of the ring member and the imaging element in a direction of the optical axis, and having a third light transmittance smaller than the first light transmittance with respect to the predetermined wavelength.

2. The in-vehicle camera according to claim 1, wherein the third resin is not in contact with the imaging element on the circuit board.

3. The in-vehicle camera according to claim 1, wherein the one end surface of the tubular shape of the housing portion is fixed with the ring member over the entire periphery of the tubular shape.

4. The in-vehicle camera according to claim 1, wherein the one end surface of the tubular shape of the housing portion and the second surface of the ring member are fixed by laser welding using a laser beam transmitted from the first surface to the second surface of the ring member.

5. The in-vehicle camera according to claim 1, wherein the lens barrel and the ring member are integrally formed.

6. The in-vehicle camera according to claim 1, wherein the lens barrel and the ring member are bonded to each other.

7. The in-vehicle camera according to claim 1, wherein the third resin contains at least silicone.

8. The in-vehicle camera according to claim 1, wherein
a part of the lens barrel protrudes to an inner side of the housing portion with the ring member as a reference, and
at least a part of the third resin is disposed between the part of the lens barrel and an inner surface of the tubular shape of the housing portion.

9. The in-vehicle camera according to claim 1, wherein a part of the third resin is in contact with the first surface of the circuit board.

10. The in-vehicle camera according to claim 9, wherein a part of the third resin is in contact with an inner surface of the tubular shape of the housing portion.

11. The in-vehicle camera according to claim 10, wherein the circuit board has an end surface connecting the first surface of the circuit board and the second surface of the circuit board, and
a part of the third resin is disposed between the end surface of the circuit board and the inner surface of the tubular shape of the housing portion.

12. The in-vehicle camera according to claim 11, wherein a part of the third resin is in contact with the second surface of the circuit board.

13. The in-vehicle camera according to claim 1, wherein the housing portion includes a bottom surface portion, that closes the tubular shape, on a side opposite to the one end surface of the tubular shape.

14. The in-vehicle camera according to claim 13, wherein a part of the third resin is in contact with an inner surface of the bottom surface portion of the housing portion.

15. The in-vehicle camera according to claim 1, wherein the predetermined wavelength is from 800 nm to 1200 nm.

* * * * *